(12) United States Patent
Cimadamore et al.

(10) Patent No.: US 12,379,963 B2
(45) Date of Patent: Aug. 5, 2025

(54) MANAGING TEMPORAL DEPENDENCIES BETWEEN SETS OF FOREIGN RESOURCES

(71) Applicant: Oracle International Corporation, Redwood Shores, CA (US)

(72) Inventors: Maurizio Cimadamore, Donabate (IE); Paul David Sandoz, Campbell, CA (US)

(73) Assignee: Oracle International Corporation, Redwood Shores, CA (US)

(*) Notice: Subject to any disclaimer, the term of this patent is extended or adjusted under 35 U.S.C. 154(b) by 571 days.

(21) Appl. No.: 17/733,287

(22) Filed: Apr. 29, 2022

(65) Prior Publication Data

US 2023/0350716 A1    Nov. 2, 2023

(51) Int. Cl.
  G06F 9/50     (2006.01)
  G06F 9/455    (2018.01)
  G06F 12/02    (2006.01)

(52) U.S. Cl.
  CPC .......... G06F 9/5016 (2013.01); G06F 9/5022 (2013.01); *G06F 9/45558* (2013.01); *G06F 2009/45583* (2013.01); *G06F 12/0253* (2013.01)

(58) Field of Classification Search
  CPC ........ G06F 9/5016; G06F 9/5022; G06F 9/52; G06F 9/544; G06F 12/0253; G06F 13/1663
  See application file for complete search history.

(56) References Cited

U.S. PATENT DOCUMENTS

| | | | |
|---|---|---|---|
| 10,223,256 B1 | 3/2019 | Schneider et al. | |
| 11,023,299 B2* | 6/2021 | Ritchie | G06F 9/44536 |
| 11,106,501 B2* | 8/2021 | Burriss | G06F 9/5016 |
| 11,356,382 B1* | 6/2022 | Goyal | H04L 47/781 |
| 11,422,872 B2* | 8/2022 | Neilson | G06F 16/2329 |
| 2001/0037336 A1 | 11/2001 | Sauntry et al. | |

(Continued)

OTHER PUBLICATIONS

Cimadamore, "Foreign Memory Access—Pulling all the threads", Retrieved at https://inside.java/2021/01/25/memory-access-pulling-all-the-threads/, Jan. 25, 2021, 6 Pages.

(Continued)

*Primary Examiner* — Lewis A Bullock, Jr.
*Assistant Examiner* — John Robert Dakita Ewald
(74) *Attorney, Agent, or Firm* — Invoke

(57) ABSTRACT

Techniques for managing temporal dependencies between sets of foreign resources are disclosed, including: allocating, in a runtime environment, a segment of foreign memory to a first memory session, the runtime environment being configured to use a garbage collector to manage memory in a heap, and the foreign memory including off-heap memory that is not managed by the garbage collector; opening, in the runtime environment, a second memory session that descends from the first memory session; while the second memory session is open, encountering a request to close the first memory session; responsive to encountering the request to close the first memory session, determining that the first memory session has at least one open descendant memory session; responsive to determining that the first memory session has at least one open descendant memory session, declining the request to close the first memory session.

17 Claims, 11 Drawing Sheets

(56) References Cited

U.S. PATENT DOCUMENTS

| | | |
|---|---|---|
| 2005/0028140 A1 | 2/2005 | Ayachitula et al. |
| 2009/0019249 A1 | 1/2009 | Kessler |
| 2012/0222005 A1 | 8/2012 | Harris et al. |
| 2015/0081978 A1 | 3/2015 | Daly |
| 2017/0139824 A1 | 5/2017 | Dragoljevic et al. |
| 2018/0136842 A1* | 5/2018 | Kim .................. G06F 3/0644 |
| 2019/0347211 A1 | 11/2019 | Bortnikov et al. |
| 2019/0379736 A1 | 12/2019 | Kravtsov |
| 2023/0005097 A1* | 1/2023 | Gurfinkel ............... G06F 9/545 |

OTHER PUBLICATIONS

Cimadamore, "Resource Scope Dependencies", Retrieved at https://inside.java/2021/10/12/panama-scope-dependencies/, Oct. 12, 2021, 9 Pages.

* cited by examiner

```
1   class ReusablePool {
2       private MemorySegment segment;
3
4       ReusablePool(MemorySession session) {
5           segment = MemorySegment.allocateNative(1000, session);
6       }
7
8       Function<Long, MemorySegment> getAllocator(MemorySession clientSession) {
9           // check if clientSession is a descendant of the segment's session
10          if (!clientSession.isAliveIn(segment.session ()))
11              throw new IllegalArgumentException();
12
13          return new Function<Long , MemorySegment>() {
14              long start = 0;
15
16              public MemorySegment apply(Long size) {
17                  if (size + start > segment.byteSize()) {
18                      throw new OutOfMemoryError();
19                  } else {
20                      start += size ;
21                      // Borrow a segment's slice and owned by the clientSession
22                      return clientSession.borrow(segment.asSlice(start, size));
23                  }
23              }
24          };
25      }
26  }
```

704

```
1   MemorySession poolSession = MemorySession.open() ;
2   ReusableAllocator pool = new ReusablePool(poolSession);
3
4   // clientSession is a child of poolSession
5   // poolSession can only be closed after clientSession is closed
6   try (MemorySession clientSession = MemorySession.open(poolSession)) {
7       Function<Long, MemorySegment> allocator = pool.getAllocator(clientSession);
8       MemorySegment segment1 = allocator.apply(10);
9       MemorySegment segment2 = allocator.apply(20);
10      MemorySegment segment3 = allocator.apply(30);
11      poolSession.close();
12  }
```

```
1   MemorySession publicSession = ... // omitted for brevity
2   MemorySession privateSession = MemorySession.openConfined(publicSession);
3
4   MemorySegment getSegment(long size) {
5      return MemorySegment.allocateNative(size, publicSession);
6   }
7
8   void tearDown() {
9      privateSession.close();
10     publicSession.close();
11  }
```

708

```
1   void criticalAccess(MemorySegment segment) {
2      try (MemorySession criticalSession =
           MemorySession.openConfined(segment.session())) {
3         // code to access the segment omitted for brevity
4      }
5   }
```

```
1  class Mutex {
2      private final MemorySegment segment;
3      private final AtomicBoolean acquired = new AtomicBoolean();

4      Mutex(long size, long align, MemorySession session) {
5          this.segment = MemorySegment.allocateNative(size, align, session);
6      }

7      public MemorySegment acquire(MemorySession session) {
8          if (acquired.compareAndSet(false, true)) {
9              try {
10                 MemorySegment acquired = session.borrow(segment);
11                 session.addCloseAction(this::release);
12                 return acquired;
13             } catch (IllegalStateException ex) {
14                 release();
15                 throw ex;
16             }
17         } else {
18             throw new IllegalStateException();
19         }
20     }
21
22     private void release() {
23         acquired.compareAndSet(true, false);
24     }
25 }
26
27 MemorySession root = MemorySession.openShared();
28 Mutex mutex = new Mutex(100, 1, root);
29 ... // thread A
30 try (MemorySession sessionA = MemorySession.openConfined(root)) {}
31    MemorySegment segment = mutex.acquire(sessionA);
32    // work on segment
33    ...
34 } // release mutex
35
36 ... // thread B
37 try (MemorySession sessionB = MemorySession.openConfined(root)) {}
38    MemorySegment segment = mutex.acquire(sessionB);
39    // work on segment
40    ...
41 } // release mutex
42 ...
```

MANAGING TEMPORAL DEPENDENCIES BETWEEN SETS OF FOREIGN RESOURCES

CROSS-REFERENCE TO RELATED APPLICATIONS

This application is related to co-pending U.S. patent application Ser. No. 17/733,258, titled "Managing Lifecycles of Sets of Foreign Resources" and filed on even date herewith, the entire contents of which are hereby incorporated by reference.

This application includes subject matter that is related to subject matter disclosed in co-pending U.S. patent application Ser. No. 17/038,766, titled "Techniques for Accessing Off-Heap Memory" and filed on Sep. 30, 2020, the entire contents of which are hereby incorporated by reference.

This application includes subject matter that is related to subject matter disclosed in co-pending U.S. patent application Ser. No. 17/024,209, titled "Transitioning Between Thread-Confined Memory Segment Views and Shared Memory Segment Views" and filed on Sep. 17, 2020, the entire contents of which are hereby incorporated by reference.

TECHNICAL FIELD

The present disclosure relates to resource management in computer systems. In particular, the present disclosure relates to managing temporal dependencies between sets of foreign resources such as off-heap memory.

BACKGROUND

A runtime environment uses a heap, which is an area of memory from which memory is allocated for runtime data (e.g., class instances, arrays, etc.). The runtime environment includes a garbage collector that monitors the heap and frees memory that is no longer in use (e.g., memory allocated to objects to which there are no longer any strong references). For example, the Java Runtime Environment (JRE) includes a Java Virtual Machine (JVM) that uses a garbage collector to manage data stored in the Java heap.

In some cases, a program executing in the runtime environment seeks to use "foreign" resources, i.e., off-heap memory that the garbage collector does not manage. Foreign resources may be "native" to the operating environment that hosts the runtime environment. For example, native memory buffers, native function pointers, etc. are "foreign" resources because they occupy off-heap memory that the garbage collector does not manage.

Because the garbage collector does not manage foreign resources, it is important for program code executing in the runtime environment to keep track of when foreign resources are in use. Deallocating foreign resources that are still in use can result in unpredictable system behavior, such as data corruption and/or crashes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment and mean at least one. In the drawings:

FIGS. 7A-7C illustrate examples of managing temporal dependencies between sets of foreign resources in accordance with one or more embodiments.

DETAILED DESCRIPTION

In the following description, for the purposes of explanation and to provide a thorough understanding, numerous specific details are set forth. One or more embodiments may be practiced without these specific details. Features described in one embodiment may be combined with features described in a different embodiment. In some examples, well-known structures and devices are described with reference to a block diagram form, in order to avoid unnecessarily obscuring the present invention.

The following table of contents is provided for reference purposes only and should not be construed as limiting the scope of one or more embodiments.

1. General Overview
   2. Architectural Overview
      2.1. Example Architecture
      2.2. Example Class File Structure
      2.3. Example Virtual Machine Architecture
      2.4. Loading, Linking, and Initializing
   3. Example System
      3.1. System Components
      3.2. User Interface
   4. Managing Temporal Dependencies Between Sets of Foreign Resources
   5. Example Embodiments
   6. Computer Networks and Cloud Networks
   7. Hardware Overview
   8. Miscellaneous; Extensions

1. General Overview

One or more embodiments manage temporal dependencies between sets of foreign resources. Specifically, one or more embodiments prevent foreign resources from being deallocated when one or more memory sessions still have access to them. A runtime environment allocates a set of foreign resources to a memory session. Additional memory sessions may be opened as descendants of that memory session (the "parent" memory session), and subsets of the foreign resources can be made available to the descendants. As long as the parent memory session still has any open descendants, it cannot be closed. Keeping the parent memory session open ensures that the descendant(s) won't attempt to access foreign resources that have been deallocated. Thus, one or more embodiments improve system stability and reliability.

One or more embodiments described in this Specification and/or recited in the claims may not be included in this General Overview section.

2. Architectural Overview

2.1. Example Architecture

Figure 1:
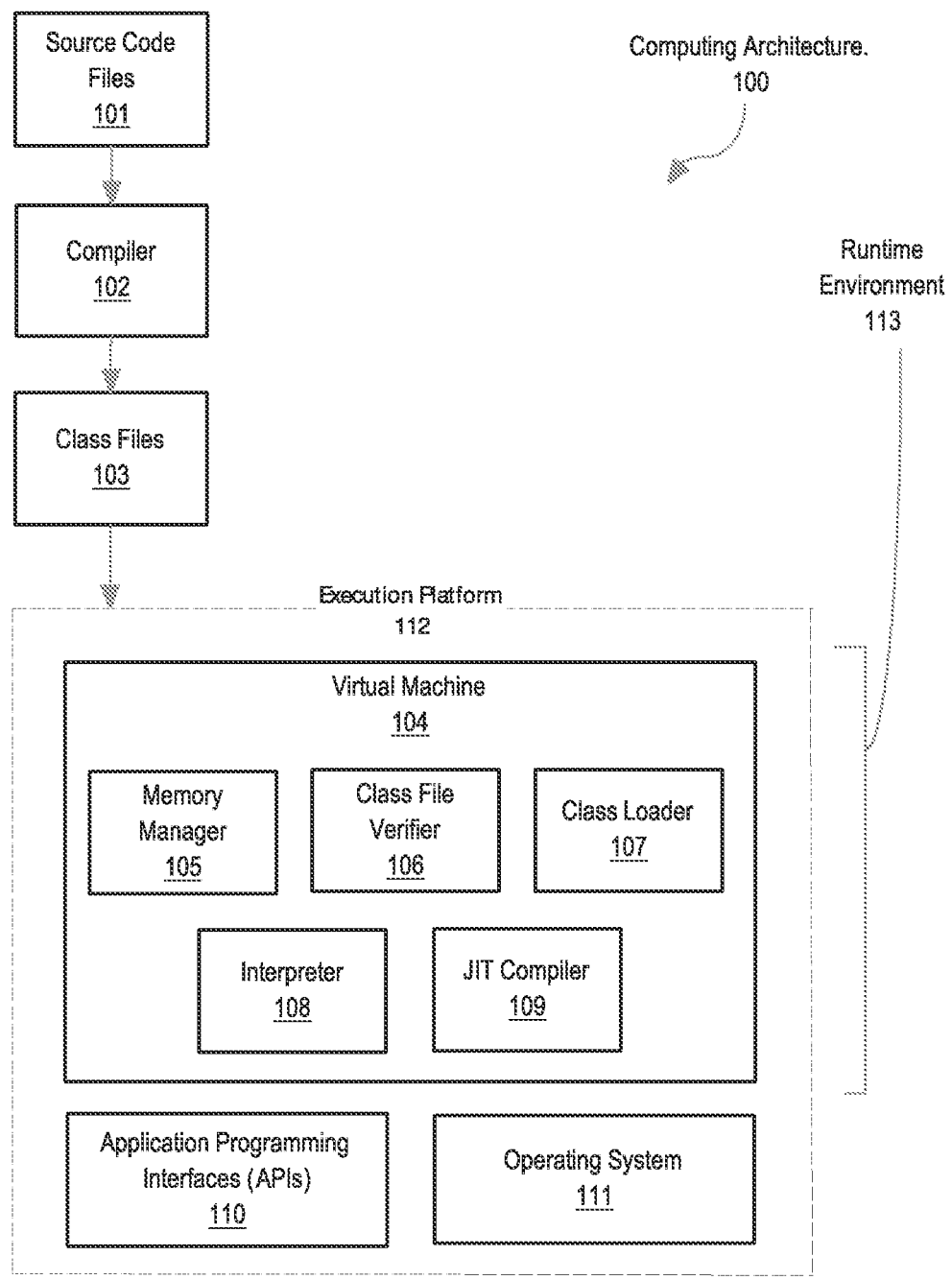
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.2. Example Class File Structure

Figure 2:
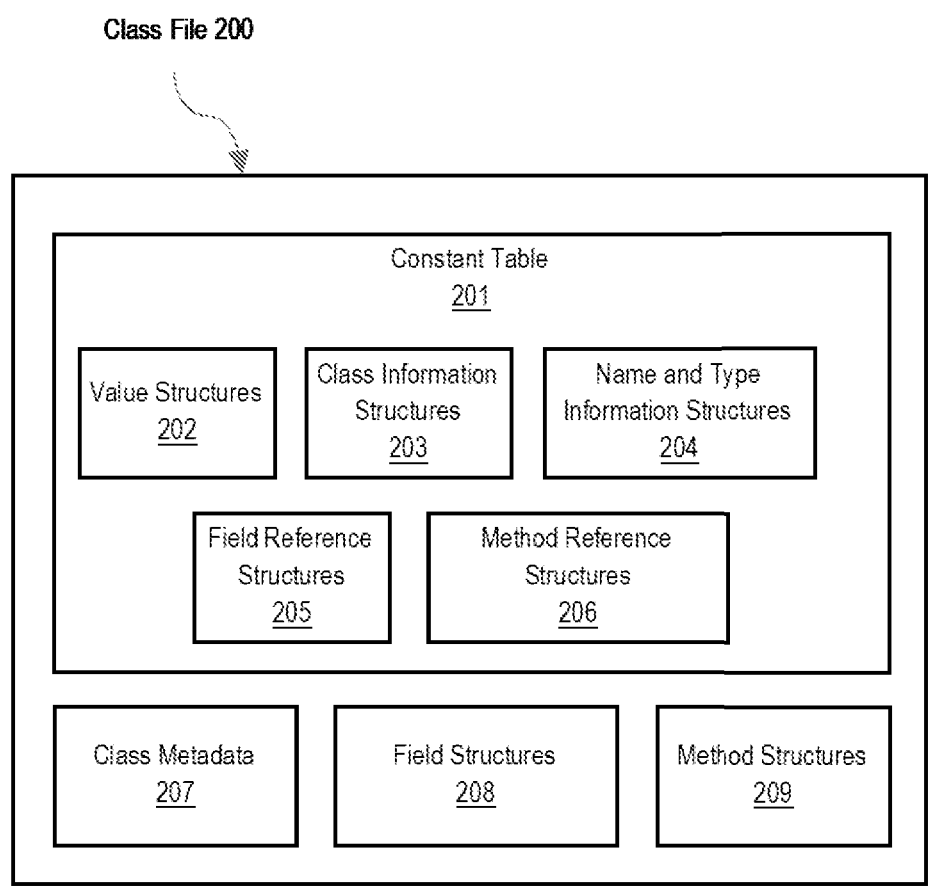
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) {...}" matches the descriptor "(I D L Thread) L Object".

In an embodiment, the virtual machine instructions held in the method structures 209 include operations which reference entries of the constant table 201. Using Java as an example, consider the following class:

```
class A
{
  int add12and13( ) {
    return B.addTwo(12, 13);
  }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.3. Example Virtual Machine Architecture

Figure 3:
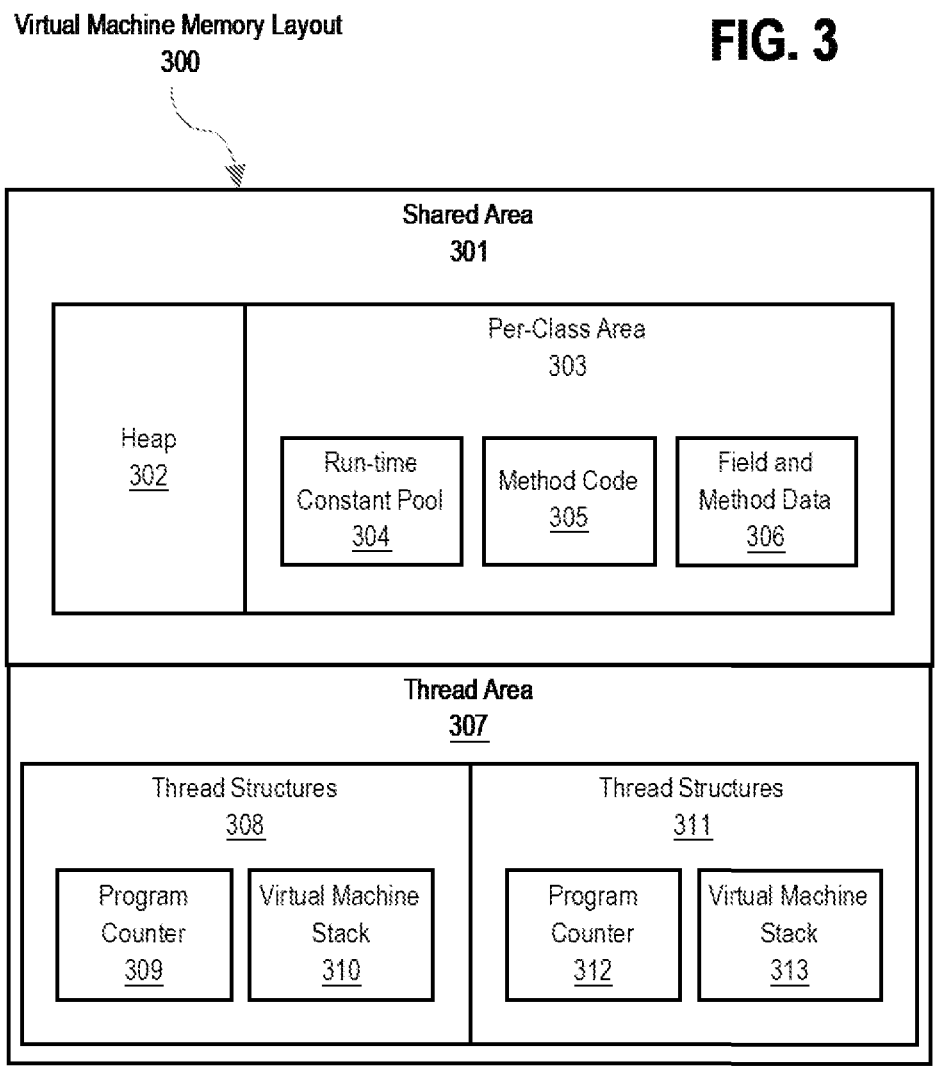
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
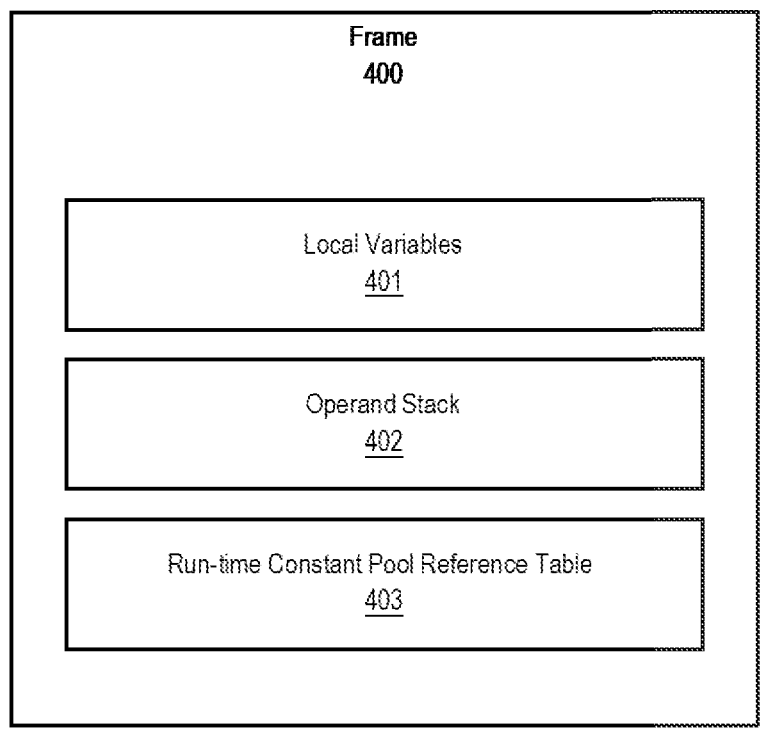
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.4. Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Example System

3.1. System Components

Figure 5:
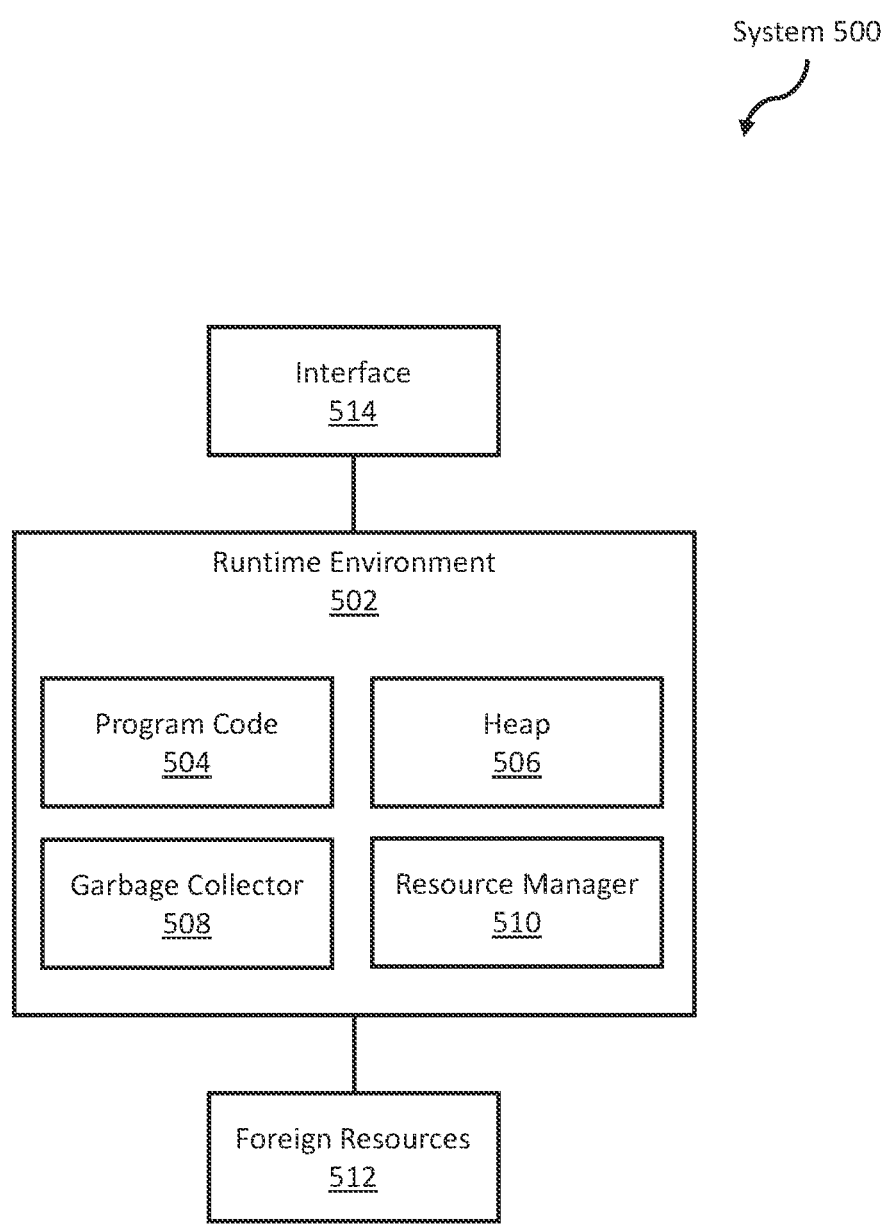
FIG. 5 shows a block diagram that illustrates an example of a system in accordance with one or more embodiments.

FIG. 5 illustrates an example of a system 500 in accordance with one or more embodiments. As illustrated in FIG. 5, the system 500 includes a runtime environment 502, a program code 504, a heap 506, a garbage collector 508, a resource manager 510, foreign resources 512, and an interface 514. In one or more embodiments, the system 500 may include more or fewer components than the components illustrated in FIG. 5. The components illustrated in FIG. 5 may be local to or remote from each other. The components illustrated in FIG. 5 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in the section titled "Computer Networks and Cloud Networks."

In the example illustrated in FIG. 5, a runtime environment 502 is configured to execute program code 504. For example, the runtime environment 502 may be a JRE and the program code 504 may include Java bytecode. The runtime environment 502 may be configured to execute the program code 504 using a virtual machine (e.g., a JVM) (not shown).

The runtime environment 502 includes components that are configured to manage resources generated and used by the program code 504. Specifically, the runtime environment 502 includes a heap 506 and a garbage collector 508. The garbage collector 508 is configured to use various garbage collection techniques to deallocate memory in the heap 506 that is no longer being used by the program code 504. For example, garbage collection techniques performed by the garbage collector 508 may include one or more of: incremental or "minor" garbage collection; full or "major" garbage collection; serial garbage collection; parallel garbage collection; concurrent mark sweep (CMS); garbage-first (G1) garbage collection; and/or other garbage collection techniques.

Foreign resources 512 are resources that occupy off-heap memory that the garbage collector 508 does not manage. Foreign resources 512 may be "native" to the operating environment that hosts the runtime environment 502. For example, native memory buffers, native function pointers, handles to open files, sockets, native libraries (e.g., using the Linux "dlopen" function to load a native library, which may be unloaded when no longer needed), etc. are "foreign" resources because they occupy off-heap memory that the garbage collector 508 does not manage. Because foreign resources 512 occupy off-heap memory, examples described herein with respect to "foreign memory" may apply to any kind of foreign resources 512.

In one or more embodiments, a resource manager 510 refers to hardware and/or software configured to perform operations described herein for managing temporal dependencies between sets of foreign resources 512. Some or all of the functionality of the resource manager 510 may be implemented in program code 504. Alternatively or additionally, some or all of the functionality of the resource manager 510 may be implemented as part of the runtime environment 502, independent of the program code 504. For example, the resource manager 510 may be part of a package or library that is available to the program code 504.

In one or more embodiments, one or more components of the system 500 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

3.2. User Interface

In one or more embodiments, an interface 514 refers to hardware and/or software configured to facilitate communications between a user and the runtime environment 502. For example, the interface 514 may be part of an integrated development environment (IDE) used to generate the program code 504.

The interface 514 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms. Different components of the interface 514 may be specified in different languages. For example, the behavior of user interface elements may be specified in a dynamic programming language, such as JavaScript. The content of user interface elements may be specified in a markup language, such as hypertext markup language (HTML) or XML User Interface Language (XUL). The layout of user interface elements may be specified in a style sheet language, such as Cascading Style Sheets (CSS). Alternatively, the interface 514 may be specified in one or more other languages, such as Java, Python, C, or C++.

4. Managing Temporal Dependencies Between Sets of Foreign Resources

Figure 6A:
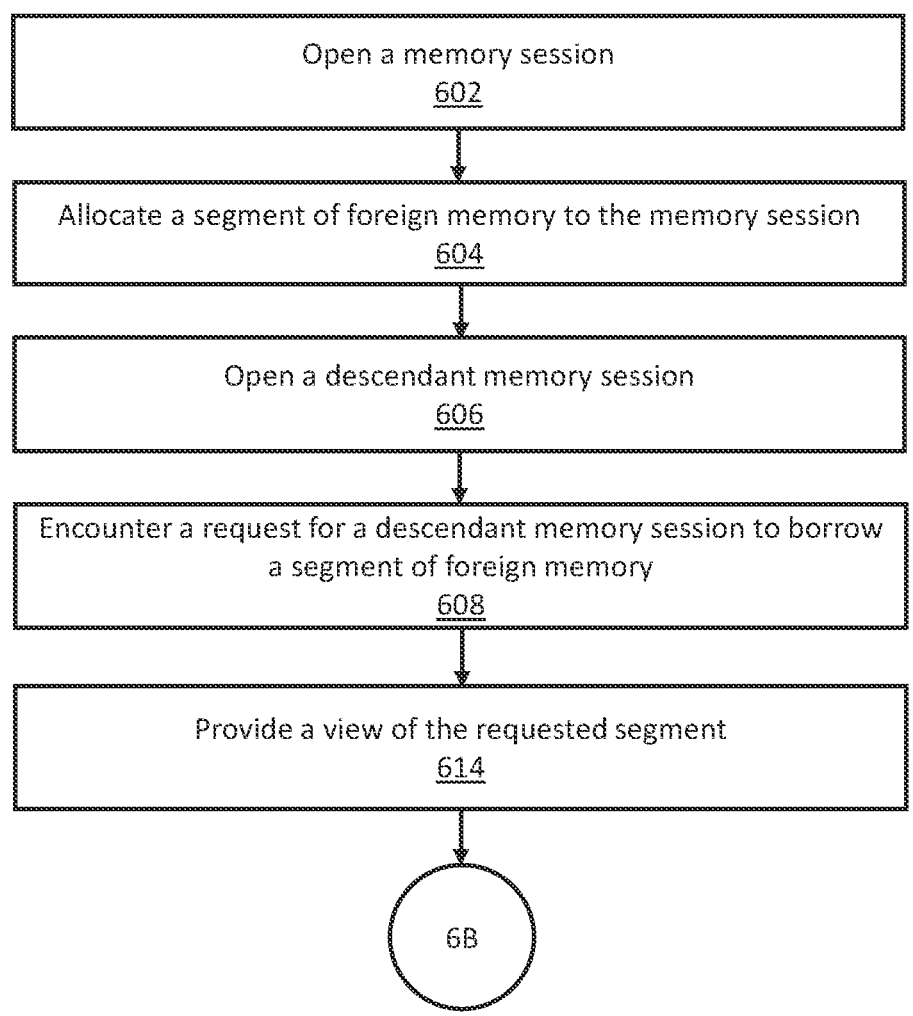
FIGS. 6A & 6B illustrate an example set of operations for managing temporal dependencies between sets of foreign resources in accordance with one or more embodiments.
Figure 6B:
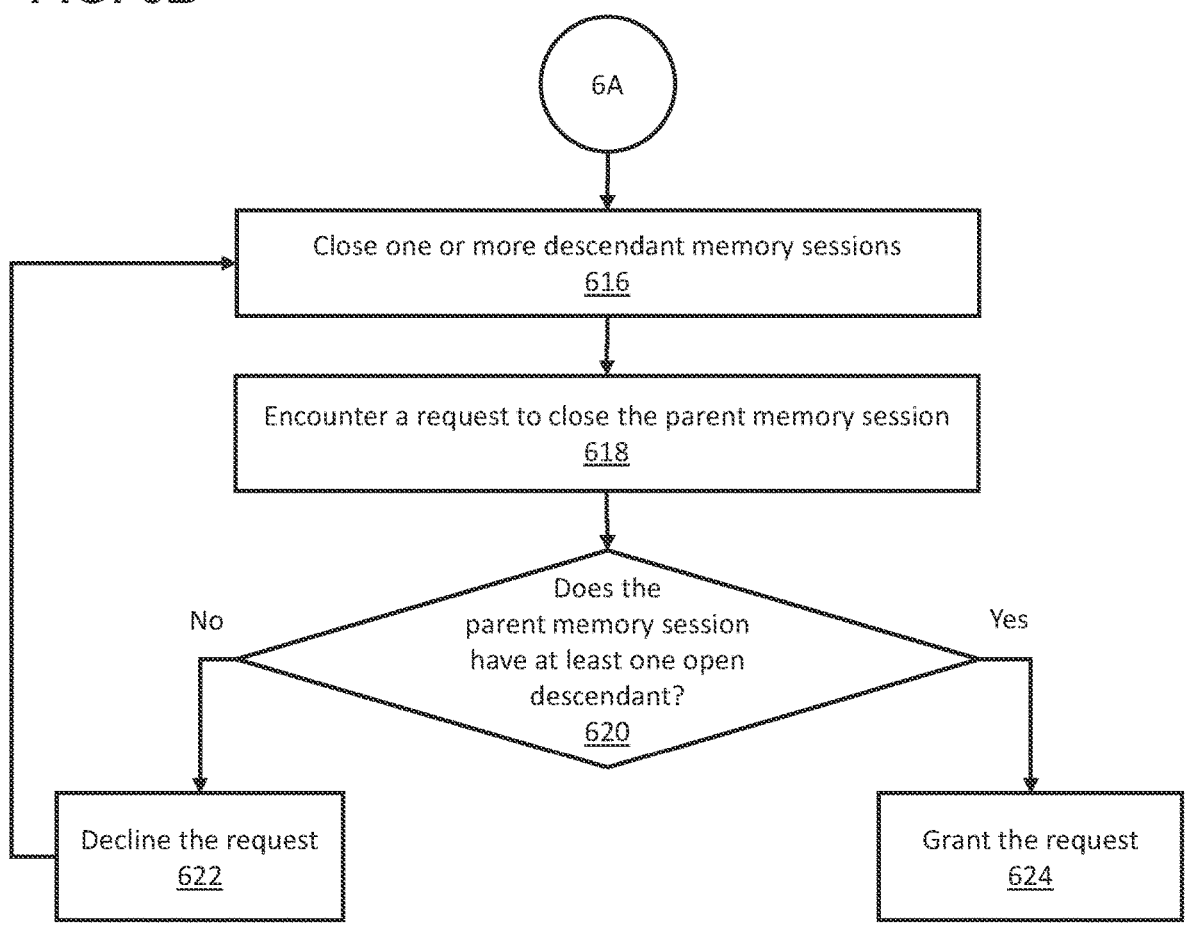

FIGS. 6A & 6B illustrate an example set of operations for managing temporal dependencies between sets of foreign resources in accordance with one or more embodiments. One or more operations illustrated in FIGS. 6A & 6B may be modified, rearranged, or omitted all together. Accordingly, the particular sequence of operations illustrated in FIGS. 6A & 6B should not be construed as limiting the scope of one or more embodiments.

Examples are described herein with reference to the example system illustrated in FIG. 5. In an embodiment, the runtime environment opens a memory session (Operation 602). The memory session is an on-heap structure. The runtime environment may open the memory session responsive to an explicit instruction in code, and/or responsive to detecting a predefined runtime condition that indicates a need for foreign resources (e.g., instantiating a class that relies on a memory session).

The runtime environment allocates one or more segments of foreign memory to the memory session (Operation 604). For example, in a Java environment, the runtime environment may instantiate an object of a type corresponding to a memory segment and allocate one or more subsets of the foreign memory to that memory segment. The runtime environment may allocate the segment(s) of foreign memory to the memory session responsive to an explicit instruction in code, and/or responsive to detecting a predefined runtime condition that indicates a need for a memory segment. The number of memory segments needed at runtime may not be known at development or compile time. Instantiating a memory segment and allocating foreign memory to the memory segment are discussed in further detail in co-pending U.S. patent application Ser. No. 17/733,258, titled "Managing Lifecycles of Sets of Foreign Resources," incorporated by reference above.

Subsequent to opening the memory session, the runtime environment opens an additional memory session (Operation 606) that "descends" from the memory session opened in Operation 602 (now referred to as the "parent" memory session). The runtime environment may open the descendant memory session responsive to an explicit instruction in code, and/or responsive to detecting a predefined runtime condition that indicates a need for another memory session.

Over the course of program execution, the runtime environment may open multiple descendant memory sessions. Alternatively or additionally, a descendant memory session may itself have one or more descendants. A second-level descendant ("grandchild") of the original parent memory session may have further descendants of its own, and so on. One or more embodiments support any number of levels of parent-child relationships between memory sessions, originating from the original parent memory session. Multiple such hierarchies may coexist, each with different top-level parent memory sessions.

Logically, the relationship between the parent memory session and the descendant(s) may be viewed as a directed acyclic graph in which nodes represent memory sessions and each edge of the graph represents a respective parent-child relationship between memory sessions. The runtime environment may maintain a data structure that tracks parent-child relationships between memory sessions. For example, the runtime environment may maintain (e.g., on the heap) a data structure corresponding to a directed acyclic graph as described above. A function that instantiates the descendant memory session may receive a reference to the parent memory session as a parameter. Responsive to receiving the reference, the function may store a parent-child association between (a) the reference to the parent memory session and (b) a reference to the newly opened child/descendant memory session. As output, the function may return the reference to the child/descendant memory session.

In an embodiment, each memory session includes a reference counter that is incremented when a child session is created and decremented when a child session is closed. Depending on the kind of session, reference counting may be simple or atomic. For example, if access occurs within the same thread, then a simple variable (e.g., an integer) may be sufficient to implement the reference counter. However, because updates could occur from multiple threads, a simple variable is insufficient if a session is shared. For example, a memory session may be opened with implicit closure, as discussed in co-pending U.S. patent application Ser. No. 17/733,258, titled "Managing Lifecycles of Sets of Foreign Resources," incorporated by reference above. Cleaner-backed sessions with implicit closure may be referred to simply as "implicit sessions" and can present issues for reference counting. Implicit sessions can be "confined" (e.g., only usable within a certain owner thread), in which case a cleaner (e.g., garbage collector) executing in a different thread is responsible for deallocating memory associated with sessions that are no longer in use. Because the cleaner executes in a different thread than the thread that owns the memory session, the cleaner might deallocate a descendant's memory without decrementing the parent's reference counter, thereby invalidating the reference count. To address this situation, two reference counters may be kept: one counter for references that originate in the same thread as the parent memory session, and another counter for the cleaner to track implicitly closable descendant memory sessions. Each counter may be updated atomically. In an embodiment, to close the parent memory session, both reference counters must equal zero.

Returning to the operations of FIGS. 6A & 6B, in an embodiment, a memory segment allocated to the parent memory session may be used by the parent memory session or one or more descendant memory sessions. A descendant memory session may be said to "borrow" a segment of foreign memory from the parent memory session, and the parent memory session may be said to provide the descendant memory session with a "view" of the borrowed memory segment; the "view" makes it appear as though the segment were owned by the descendant. The runtime environment may encounter a request for a descendant memory session to borrow a segment of foreign memory allocated to the parent memory session (Operation 608). Responsive to the request, the parent memory session provides the descendant memory session with a view of the requested segment (Operation 614).

Some period of time after opening a descendant memory session, the runtime environment may close that memory session (Operation 616). The parent memory session may still have one or more other descendants still open. For example, two child memory sessions may have been opened and after closing one of them, the other remains open. Alternatively, closing the descendant memory session may result in the parent memory session no longer having any open descendants.

In an embodiment, the runtime environment encounters a request to close the parent memory session (Operation 618). The request may come from a thread that is independent from the thread that hosts the parent memory session, or from the same thread. Responsive to the request, the runtime environment determines whether the parent memory session has at least one open descendant (Operation 620). If at least one open descendant remains, then the runtime environment declines the request (Operation 622). Declining the request helps ensure that the parent memory session backing the foreign resources is not closed while a descendant still has access to the foreign resources. Allowing a descendant to continue accessing the foreign resources when they are no longer backed by an open memory session could result in unpredictable system behavior, such as data corruption and/or crashes. As shown in FIG. 6B, the runtime environment may continue to decline any requests to close the parent memory session as long as any descendant(s) remain(s) open. However, if the runtime environment encounters a request to close the parent memory session when the parent memory session no longer has any open descendants, then the runtime environment grants the request (Operation 624).

Operations described above help manage temporal dependencies between sets of foreign resources. Specifically, one or more embodiments prevent foreign resources from being deallocated when one or more memory sessions still have access to them. Thus, one or more embodiments improve system stability and reliability.

5. Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims. Specifically, FIGS. 7A-7C illustrate examples of managing temporal dependencies between sets of foreign resources in accordance with one or more embodiments.

In FIG. 7A, code 702 is an example of a class declaration for a reusable pool of foreign resources, according to one or more embodiments. The reusable pool is backed by a particular session, referred to here as the parent session. If the reusable pool is closed, the foreign resources are released. As indicated on lines 10-11 of the code 702, another memory session ("clientSession") can use foreign resources from the reusable pool only if it is a descendant of the parent session. If not, then line 11 throws an exception. This approach helps ensure that while the descendant session is alive, the pool memory cannot be released/deallocated. Thus, the descendant session can use the reusable pool without worrying about whether the underlying resources will be deallocated unexpectedly. One or more embodiments may enforce additional restrictions on a reusable pool. For example, a reusable pool may set limits on where foreign resources used by a descendant can begin and/or end, how much of the foreign resources can be used by each descendent, how many descendants are permitted to access the same pool, etc.

Code 704 is an example of using the reusable pool shown in code 702. Line 1 opens the parent memory session ("poolSession"). Line 2 allocates foreign resources to the parent memory session, using the "ReusablePool" class; these resources serve as the reusable pool. In an embodiment, the parent memory session includes a reference counter. When a new child session is created, the runtime environment increments the reference counter by one. When a child session is closed, the runtime environment decrements the reference counter by one. The parent memory session can be closed only when the counter is zero; otherwise, the attempt to close the parent memory session is declined.

Continuing the example, the try block starting on line 6 declares a newly opened memory session as a resource; the new memory session is opened as a child of the parent memory session. The opening brace (line 6) and closing brace (line 12) of the try block delineate the child memory session's scope, i.e., its lifecycle. Unless the child memory session is explicitly closed first, the parent memory session cannot be closed within the try block. For example, the attempt to close the parent memory session at line 11—included here only for illustrative purposes—would fail. However, when the try block terminates, the child memory session is closed (a feature of the try-with-resources structure) and the parent memory session also can be closed.

Within the try block, line 7 obtains foreign resources from the reusable pool, backed by the parent memory session. If the parent memory session were permitted to close while these resources were still in use, unpredictable system behavior could result. In the example illustrated in FIG. 7, the parent memory session ("poolSession") cannot be closed prematurely; it can only be closed after its descendant memory session ("clientSession") is closed.

Turning to FIG. 7B, code 706 is an example of configuring a non-closable session. Specifically, the segment returned in line 5 of code 706 cannot be closed. The "teardown" method closes both the parent session and the confined child session. The approach shown in code 706 may be useful, for example, in creating a library that can return segments attached to sessions that cannot be closed inadvertently by clients.

Code 708 is an example of configuring a critical section of code that can manipulate a memory segment with the guarantee that another section of code cannot close the segment. Because the session ("criticalSession") exists only within the try block, no code outside of the try block is able to access the segment allocated to the session.

Turning to FIG. 7C, code 710 illustrates an example of "serial confinement," where multiple threads access a resource "one thread at a time." In this example, at lines 1-25, the Mutex class creates a "private" segment that cannot be directly accessed by clients (e.g., by descendant sessions). To obtain access to the private segment, a client must "acquire" the segment through the Mutex class. The acquire operation "borrows" the private segment into the client session; this example assumes that the client session is a descendant of the mutex session. When the client session is closed, the mutex is released and becomes available for another client. Because of scope dependencies, the mutex session cannot be closed while there is an active client that has acquired the segment.

The example of FIG. 7C illustrates how two threads may safely cooperate using a mutex class. Each thread obtains a confined view of the segment, so that the segment is only accessible inside that thread. When a thread is finished, it closes its respective child session, and another client in another thread may acquire the segment. In addition, in this example, the off-heap segment is allocated only once (by the Mutex class); all of the clients use borrowing, by creating a new MemorySegment instance that points to the same off-heap memory—but with a different session owner.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service, such as execution of a particular application and/or storage of a particular amount of data). A server process responds by, for example, executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, or a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network, such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

A client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (for example, a web browser), a program interface, or an application programming interface (API).

In one or more embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In one or more embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

A computer network may implement various deployment, including but not limited to a private cloud, a public cloud, and/or a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof may be accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In one or more embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In a multi-tenant computer network, tenant isolation may be implemented to ensure that the applications and/or data of different tenants are not shared with each other. Various tenant isolation approaches may be used. Each tenant may be associated with a tenant identifier (ID). Each network resource of the multi-tenant computer network may be tagged with a tenant ID. A tenant may be permitted access to a particular network resource only if the tenant and the particular network resources are associated with the same tenant ID.

For example, each application implemented by the computer network may be tagged with a tenant ID, and tenant may be permitted access to a particular application only if the tenant and the particular application are associated with a same tenant ID. Each data structure and/or dataset stored by the computer network may be tagged with a tenant ID, and tenant may be permitted access to a particular data structure and/or dataset only if the tenant and the particular data structure and/or dataset are associated with a same tenant ID. Each database implemented by the computer network may be tagged with a tenant ID, and tenant may be permitted access to data of a particular database only if the tenant and the particular database are associated with the same tenant ID. Each entry in a database implemented by a multi-tenant computer network may be tagged with a tenant ID, and a tenant may be permitted access to a particular entry only if the tenant and the particular entry are associated with the same tenant ID. However, the database may be shared by multiple tenants.

In one or more embodiments, a subscription list indicates which tenants have authorization to access which network resources. For each network resource, a list of tenant IDs of tenants authorized to access the network resource may be stored. A tenant may be permitted access to a particular network resource only if the tenant ID of the tenant is included in the subscription list corresponding to the particular network resource.

In one or more embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted only to other devices within the same tenant overlay network. Encapsulation tunnels may be used to prohibit any transmissions from a source device on a tenant overlay network to devices in other tenant overlay networks. Specifically, packets received from the source device may be encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Hardware Overview

In one or more embodiments, techniques described herein are implemented by one or more special-purpose computing devices. The special-purpose computing device(s) may be hard-wired to perform the techniques, and/or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, FPGAs, or NPUs with custom programming to accomplish the techniques. A special-purpose computing device may be desktop computer systems, portable computer systems, handheld devices, networking devices, or any other device that incorporates hard-wired and/or program logic to implement the techniques.

Figure 8:
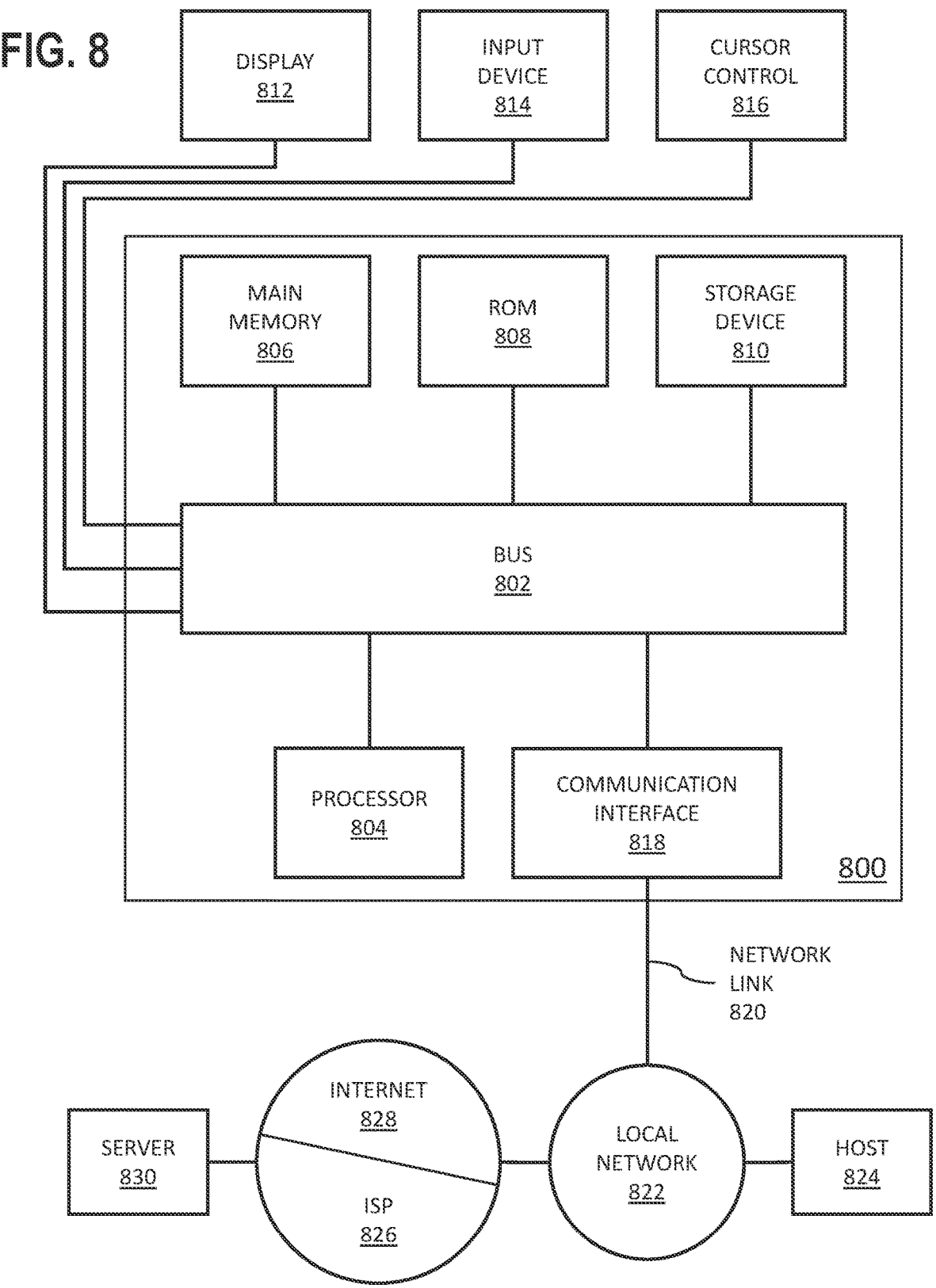
FIG. 8 shows a block diagram that illustrates a computer system in accordance with one or more embodiments.

For example, FIG. 8 is a block diagram that illustrates a computer system 800 upon which one or more embodiments of the invention may be implemented. The computer system 800 includes a bus 802 or other communication mechanism for communicating information, and a hardware processor 804 coupled with bus 802 for processing information. The hardware processor 804 may be, for example, a general-purpose microprocessor.

The computer system 800 also includes a main memory 806, such as a random access memory (RAM) or other dynamic storage device, coupled to bus 802 for storing information and instructions to be executed by processor 804. The main memory 806 also may be used for storing temporary variables or other intermediate information during execution of instructions to be executed by processor 804. Such instructions, when stored in non-transitory storage media accessible to the processor 804, render the computer system 800 into a special-purpose machine that is customized to perform the operations specified in the instructions.

The computer system 800 further includes a read only memory (ROM) 808 or other static storage device coupled to the bus 802 for storing static information and instructions for the processor 804. A storage device 810, such as a magnetic disk or optical disk, is provided and coupled to the bus 802 for storing information and instructions.

The computer system 800 may be coupled via the bus 802 to a display 812, such as a cathode ray tube (CRT), for displaying information to a computer user. An input device 814, including alphanumeric and other keys, is coupled to the bus 802 for communicating information and command selections to the processor 804. Another type of user input device is cursor control 816, such as a mouse, a trackball, or cursor direction keys for communicating direction information and command selections to the processor 804 and for controlling cursor movement on the display 812. This input device typically has two degrees of freedom in two axes, a first axis (e.g., x) and a second axis (e.g., y), that allows the device to specify positions in a plane.

The computer system 800 may implement techniques described herein using customized hard-wired logic, one or more ASICs or FPGAs, firmware, and/or program logic which in combination with the computer system 800 causes or programs the computer system 800 to be a special-purpose machine. In one or more embodiments, the techniques herein are performed by the computer system 800 in response to the processor 804 executing one or more sequences of one or more instructions contained in the main memory 806. Such instructions may be read into the main memory 806 from another storage medium, such as the storage device 810. Execution of the sequences of instructions contained in the main memory 806 causes the processor 804 to perform the process steps described herein. Alternatively, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as storage device 810. Volatile media includes dynamic memory, such as the main memory 806. Common forms of storage media include, for example, a floppy disk, a flexible disk, hard disk, solid state drive, magnetic tape, or any other magnetic data storage medium, a read-only compact disc (CD-ROM), any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires of the bus 802. Transmission media can also take the form of acoustic or light waves, such as those generated during radio frequency (RF) and infrared data communications.

Various forms of media may be involved in carrying one or more sequences of one or more instructions to the processor 804 for execution. For example, the instructions may initially be carried on a magnetic disk or solid-state drive of a remote computer. The remote computer can load the instructions into its dynamic memory and send the instructions over a telephone line or other communications medium, using a modem. A modem local to the computer system 800 can receive the data on the telephone line or other communications medium and use an infrared transmitter to convert the data to an infrared signal. An infrared detector can receive the data carried in the infrared signal and appropriate circuitry can place the data on the bus 802. The bus 802 carries the data to the main memory 806, from which the processor 804 retrieves and executes the instructions. The instructions received by the main memory 806 may optionally be stored on the storage device 810, either before or after execution by processor 804.

The computer system 800 also includes a communication interface 818 coupled to the bus 802. The communication interface 818 provides a two-way data communication coupling to a network link 820 that is connected to a local network 822. For example, the communication interface 818 may be an integrated services digital network (ISDN) card, cable modem, satellite modem, or a modem to provide a data communication connection to a corresponding type of telephone line. As another example, the communication interface 818 may be a local area network (LAN) card configured to provide a data communication connection to a compatible LAN. Wireless links may also be implemented. In any such implementation, the communication interface 818 sends and receives electrical, electromagnetic, or optical signals that carry digital data streams representing various types of information.

The network link 820 typically provides data communication through one or more networks to other data devices. For example, the network link 820 may provide a connection through a local network 822 to a host computer 824 or to data equipment operated by an Internet Service Provider (ISP) 826. The ISP 826 in turn provides data communication services through the world wide packet data communication network now commonly referred to as the "Internet" 828. The local network 822 and Internet 828 both use electrical, electromagnetic, or optical signals that carry digital data streams. The signals through the various networks and the signals on the network link 820 and through the communication interface 818, which carry the digital data to and from the computer system 800, are example forms of transmission media.

The computer system 800 can send messages and receive data, including program code, through the network(s), network link 820, and communication interface 818. In the Internet example, a server 830 might transmit a requested code for an application program through the Internet 828, ISP 826, local network 822, and communication interface 818.

The received code may be executed by processor 804 as it is received, and/or may be stored in the storage device 810 or other non-volatile storage for later execution.

8. Miscellaneous; Extensions

Embodiments are directed to a system with one or more devices that include a hardware processor and that are configured to perform any of the operations described herein and/or recited in any of the claims below.

In one or more embodiments, a non-transitory computer-readable storage medium stores instructions which, when executed by one or more hardware processors, cause performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions that, when executed by one or more processors, cause performance of operations comprising:
   allocating, in a runtime environment, a segment of foreign memory to a first memory session, the runtime environment being configured to use a garbage collector to manage memory in a heap, and the foreign memory comprising off-heap memory that is not managed by the garbage collector;

opening, in the runtime environment, a second memory session that descends from the first memory session, wherein opening the second memory session that descends from the first memory session comprises:

receiving, by a function that instantiates the second memory session, a function call with a parameter comprising a first reference to the first memory session;

responsive to the function call:
instantiating the second memory session; and
storing a parent-child association between the first memory session and the second memory session; and returning, as an output of the function that instantiates the second memory session, a second reference to the second memory session;

while the second memory session is open, encountering a first request to close the first memory session;

responsive to encountering the first request to close the first memory session, determining that the first memory session has at least one open descendant memory session; and responsive to determining that the first memory session has at least one open descendant memory session, declining the first request to close the first memory session.

2. The one or more non-transitory machine-readable media of claim 1, wherein determining that the first memory session has at least one open descendant memory session comprises:

searching a directed acyclic graph comprising (a) a plurality of nodes representing respective sessions and (b) one or more edges representing respective parent-child relationships between sessions;

determining that the one or more edges comprise(s) an edge between a first node that represents the first memory session and a second node that represents the second memory session.

3. The one or more non-transitory machine-readable media of claim 1, the operations further comprising:

subsequent to declining the first request to close the first memory session, closing the second memory session;

subsequent to closing the second memory session, encountering a second request to close the first memory session;

responsive to encountering the second request to close the first memory session, determining that the first memory session does not have any open descendant memory sessions;

responsive to determining that the first memory session does not have any open descendant memory sessions, closing the first memory session.

4. The one or more non-transitory machine-readable media of claim 1, the operations further comprising:

subsequent to declining the first request to close the first memory session, closing the second memory session;

opening, in the runtime environment, a third memory session that descends from the first memory session;

subsequent to closing the second memory session and while the third memory session is open, encountering a second request to close the first memory session;

responsive to encountering the second request to close the first memory session, determining that the first memory session has at least one open descendant memory session;

responsive to determining that the first memory session has at least one open descendant memory session, declining the second request to close the first memory session.

5. The one or more non-transitory machine-readable media of claim 1, the operations further comprising:

encountering a request for the second memory session to borrow memory from the segment of foreign memory;

granting the request for the second memory session to borrow memory from the segment of foreign memory.

6. The one or more non-transitory machine-readable media of claim 1, the operations further comprising:

maintaining a plurality of reference counters associated with the first memory session, the plurality of reference counters comprising (a) at least one reference counter for references originating in a first thread that owns the first memory session and (b) at least one reference counter for references originating outside the first thread.

7. A system comprising:

at least one device comprising one or more hardware processors, the system being configured to perform operations comprising:

allocating, in a runtime environment, a segment of foreign memory to a first memory session, the runtime environment being configured to use a garbage collector to manage memory in a heap, and the foreign memory comprising off-heap memory that is not managed by the garbage collector;

opening, in the runtime environment, a second memory session that descends from the first memory session, wherein opening the second memory session that descends from the first memory session comprises:

receiving, by a function that instantiates the second memory session, a function call with a parameter comprising a first reference to the first memory session;

responsive to the function call:
instantiating the second memory session; and
storing a parent-child association between the first memory session and the second memory session; and returning, as an output of the function that instantiates the second memory session, a second reference to the second memory session;

while the second memory session is open, encountering a first request to close the first memory session;

responsive to encountering the first request to close the first memory session, determining that the first memory session has at least one open descendant memory session; and responsive to determining that the first memory session has at least one open descendant memory session, declining the first request to close the first memory session.

8. The system of claim 7, wherein determining that the first memory session has at least one open descendant memory session comprises:

searching a directed acyclic graph comprising (a) a plurality of nodes representing respective sessions and (b) one or more edges representing respective parent-child relationships between sessions;

determining that the one or more edges comprise(s) an edge between a first node that represents the first memory session and a second node that represents the second memory session.

9. The system of claim 7, the operations further comprising:
subsequent to declining the first request to close the first memory session, closing the second memory session;
subsequent to closing the second memory session, encountering a second request to close the first memory session;
responsive to encountering the second request to close the first memory session, determining that the first memory session does not have any open descendant memory sessions;
responsive to determining that the first memory session does not have any open descendant memory sessions, closing the first memory session.

10. The system of claim 7, the operations further comprising:
subsequent to declining the first request to close the first memory session, closing the second memory session;
opening, in the runtime environment, a third memory session that descends from the first memory session;
subsequent to closing the second memory session and while the third memory session is open, encountering a second request to close the first memory session;
responsive to encountering the second request to close the first memory session, determining that the first memory session has at least one open descendant memory session;
responsive to determining that the first memory session has at least one open descendant memory session, declining the second request to close the first memory session.

11. The system of claim 7, the operations further comprising:
encountering a request for the second memory session to borrow memory from the segment of foreign memory;
granting the request for the second memory session to borrow memory from the segment of foreign memory.

12. The system of claim 7, the operations further comprising:
maintaining a plurality of reference counters associated with the first memory session, the plurality of reference counters comprising (a) at least one reference counter for references originating in a first thread that owns the first memory session and (b) at least one reference counter for references originating outside the first thread.

13. A method comprising:
allocating, in a runtime environment, a segment of foreign memory to a first memory session, the runtime environment being configured to use a garbage collector to manage memory in a heap, and the foreign memory comprising off-heap memory that is not managed by the garbage collector;
opening, in the runtime environment, a second memory session that descends from the first memory session, wherein opening the second memory session that descends from the first memory session comprises:
receiving, by a function that instantiates the second memory session, a function call with a parameter comprising a first reference to the first memory session;
responsive to the function call:
instantiating the second memory session; and
storing a parent-child association between the first memory session and the second memory session; and
returning, as an output of the function that instantiates the second memory session, a second reference to the second memory session;
while the second memory session is open, encountering a first request to close the first memory session;
responsive to encountering the first request to close the first memory session, determining that the first memory session has at least one open descendant memory session; and
responsive to determining that the first memory session has at least one open descendant memory session, declining the first request to close the first memory session,
wherein the method is performed by at least one device comprising one or more hardware processors.

14. The method of claim 13, wherein determining that the first memory session has at least one open descendant memory session comprises:
searching a directed acyclic graph comprising (a) a plurality of nodes representing respective sessions and (b) one or more edges representing respective parent-child relationships between sessions;
determining that the one or more edges comprise(s) an edge between a first node that represents the first memory session and a second node that represents the second memory session.

15. The method of claim 13, further comprising:
subsequent to declining the first request to close the first memory session, closing the second memory session;
subsequent to closing the second memory session, encountering a second request to close the first memory session;
responsive to encountering the second request to close the first memory session, determining that the first memory session does not have any open descendant memory sessions;
responsive to determining that the first memory session does not have any open descendant memory sessions, closing the first memory session.

16. The method of claim 13, further comprising:
encountering a request for the second memory session to borrow memory from the segment of foreign memory;
granting the request for the second memory session to borrow memory from the segment of foreign memory.

17. The method of claim 13, further comprising:
maintaining a plurality of reference counters associated with the first memory session, the plurality of reference counters comprising (a) at least one reference counter for references originating in a first thread that owns the first memory session and (b) at least one reference counter for references originating outside the first thread.

* * * * *